US008322125B2

(12) United States Patent
Mons et al.

(10) Patent No.: US 8,322,125 B2
(45) Date of Patent: Dec. 4, 2012

(54) TURBO-ENGINE COMPRESSOR TIP COMPRISING DE-ICING MEANS

(75) Inventors: Claude Marcel Mons, Savigny le Temple (FR); Michel Paul Lucien Vernet, Montgeron (FR)

(73) Assignee: SNECMA, Paris (FR)

( * ) Notice: Subject to any disclaimer, the term of this patent is extended or adjusted under 35 U.S.C. 154(b) by 833 days.

(21) Appl. No.: 12/481,942

(22) Filed: Jun. 10, 2009

(65) Prior Publication Data

US 2011/0179764 A1 Jul. 28, 2011

(30) Foreign Application Priority Data

Jul. 2, 2008 (FR) ..................................... 08 54486

(51) Int. Cl.
*F02C 7/047* (2006.01)

(52) U.S. Cl. .................................................... 60/39.093

(58) Field of Classification Search ............... 60/39.093; 244/134 R

See application file for complete search history.

(56) References Cited

U.S. PATENT DOCUMENTS

| | | | | |
|---|---|---|---|---|
| 3,338,049 | A * | 8/1967 | Fernberger | 60/39.092 |
| 4,099,688 | A * | 7/1978 | Jayne | 244/103 R |
| 4,741,155 | A | 5/1988 | McCarty | |
| 4,863,354 | A * | 9/1989 | Asselin et al. | 60/39.093 |

FOREIGN PATENT DOCUMENTS

| | | |
|---|---|---|
| CA | 507330 A | 11/1954 |
| DE | 826 674 | 1/1952 |
| GB | 724019 | 2/1955 |
| GB | 793 949 | 4/1958 |
| GB | 2 130 158 A | 5/1984 |

* cited by examiner

*Primary Examiner* — Ted Kim

(74) *Attorney, Agent, or Firm* — Oblon, Spivak, McClelland, Maier & Neustadt, L.L.P.

(57) ABSTRACT

The de-icing system comprises a flexible bladder (5) filled with de-icing fluid, pressed by the centrifugal forces produced when the rotor tip (1) is rotating against the inner wall thereof to apply a pressure favoring the progressive and calibrated discharge of the fluid, in the absence of a pump and any other active means. For this, the bladder comprises a concavity (11) at the rear which is automatically enlarged under the effect of centrifugal forces during operation and discharges the fluid continuously from the bladder.

8 Claims, 1 Drawing Sheet

TURBO-ENGINE COMPRESSOR TIP COMPRISING DE-ICING MEANS

Figure 1:
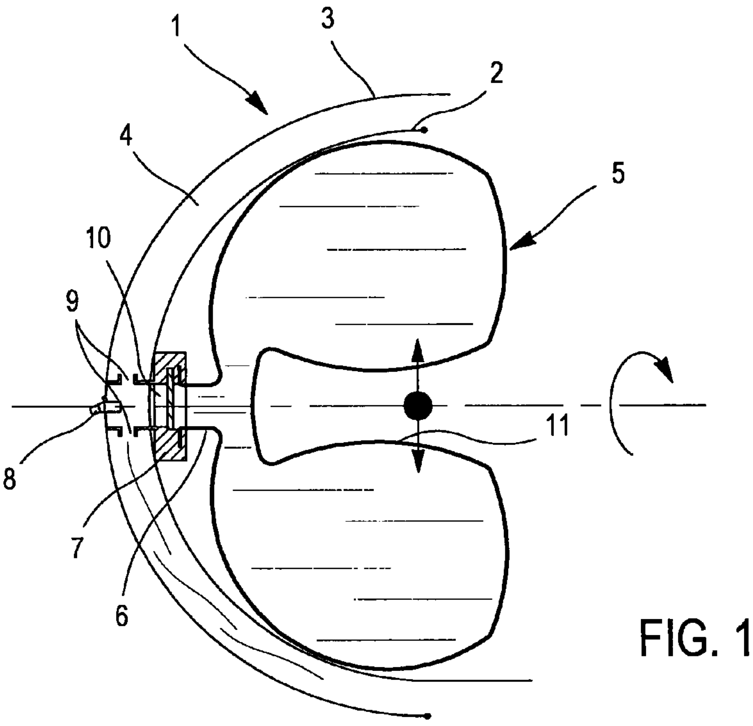

The invention relates to a turbo-engine compressor tip equipped with de-icing means.

Ice may accumulate on aircraft, particularly at the front, in an atmosphere subject to icing. The ice formed at the inlet of the engines enters therein when it is detached during flight and may cause severe damage to the rotating members and to the rotor blades in particular.

Ice formation is usually combated on aircraft structures by spraying same with de-icing products before flight, or by applying heating, vibrations thereto or by coating said structures with Teflon-based anti-adhesive paint. These methods may be effective but are however unsuccessful when the aircraft needs to fly under conditions subject to icing for a long time, possibly up to several hours. In this case, the formation of large quantities of ice is inevitable.

The aim of the invention is to enable the de-icing of the tip of a turbo-engine compressor at the front for a long period and in flight, when the compressor is moving. Furthermore, the device must be completely autonomous and inert, i.e. devoid of active means, with feed pump, engine or other, which would operate during the flight of the aircraft to replenish the tip with de-icing fluid or to create a positive pressure favoring the outlet of the fluid.

The prior art (GB-A-724 019; 1 094 372; 1 102 958 and U.S. Pat. No. 4,437,201) describes in-flight de-icing devices designed for wings or other fixed aircraft structures, and consist of porous walls through which the de-icing fluid is injected from inside the aircraft so that it spreads over the entire outer face of the wall. The source of the fluid is not described, but pumps are apparently used; the invention offers, with respect to these documents, the important advantage of ensuring a regular and continuous fluid distribution by making use of the rotation of the tip so as not to need pumping means. Therefore, the device is both simpler and more reliable.

It is characterized in that the tip contains a de-icing fluid container provided with a filling valve, the container being further provided with at least one distribution orifice of the de-icing fluid having a calibrated opening. The centrifugal forces applied to the container are used to help ensure the progressive emptying thereof during flight. It is only important for the container to be located in the tip itself, but this does not pose a problem as only the valve needs to be accessible. The calibration of the orifice or orifices means that said orifices have a small radius ensuring that the fluid distribution is regular and preventing sudden emptying. The container is formed by a flexible bladder so that the volume thereof varies as it is emptied and the continued emptying thereof is favored. To this end, the bladder comprises a concavity toward the rear (opposite the tip), which has the property of widening as draining continues.

The de-icing orifice is advantageously positioned at the front of the container, i.e. at the end of the tip, to enable the de-icing fluid to flow to the rear over the entire surface of the tip by benefiting from the forces induced by the rotational movement of the aircraft engine.

The check valve is advantageously passive, the opening thereof being performed according to the temperature, for example if it comprises an active member made of shape memory alloy.

The valve may be located at the end of the tip, extending from the check valve.

In another design, the container comprises a perforated peripheral face opening onto a spongy wall of the tip, said peripheral face thus comprising calibrated opening fluid distribution orifices.

Another aspect relates to the structure of the tip per se. Various means may be reworked or designed to favor the fluid distribution and flow. In this way, the distribution orifice may open into a gap between two skins comprising the walls of the tip, including one external skin permeable to the de-icing fluid; or, as mentioned above, the tip may comprise a layer of spongy material.

Particularly in the case where the bladder comprises a concavity directed toward the rear, the bladder may be made of a fiber-reinforced polymer, so as to give only a moderate flexibility but enable the bladder to retain the overall shape thereof irrespective of the content thereof.

The invention will now be described by means of the following figures:

FIG. 1 represents an embodiment of the invention, and

Figure 2:
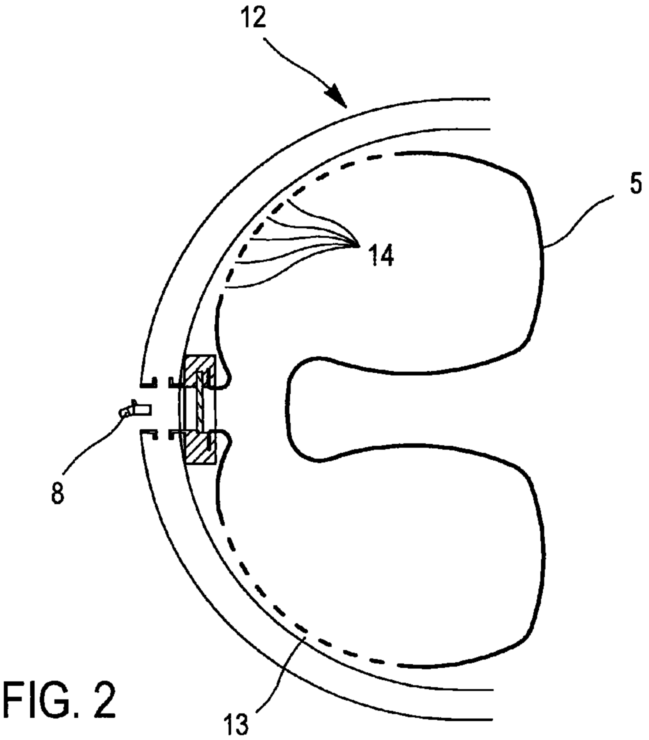

FIG. 2 a second embodiment.

With reference to FIG. 1, a rotating compressor cone forms a tip 1 facing the front. It consists of an inner skin 2 and an outer skin 3 separated by a gap 4. It contains a container 5 wherein the shape is roughly regular except at a neck 6 at the front and at a central concavity 11 at the rear (opposite the tip 1). The container 5 is made of a flexible polymer but reinforced with fibers or other materials which prevent said container from being excessively deformed and hold the general shape thereof. The opening 6 is provided with a check valve 7, and a valve 8. These two items of equipment, being attached at the front of the tip 1, hold the container 5 therein. The check valve 7 is located under the inner skin 2, and the valve 8 passes through the gap 4 and is flush with the outside of the outer skin 3. The valve 8 is provided with lateral orifices 9 arranged in a ring and facing into the gap 4. The check valve 7 opens automatically according to the temperature, and may for example comprise an active member 10 made of shape memory alloy closing same at ambient or hot temperatures but deforming and opening same when icing conditions are met. The check valve 7 may then be completely autonomous. In other, albeit less preferred, embodiments, it may also be controlled from the outside.

The container 5 is filled via the valve 8 during a maintenance operation when the aircraft is stopped; the container 5 is not supplied by a system included in the aircraft and operating during flight, unlike other designs; it must have sufficient capacity so that the content thereof is not exhausted before the next maintenance, and it must also be designed so as to allow progressive automatic emptying of the de-icing fluid, in the absence of a positive pressure produced by a supply system, at all stages of operation. The satisfaction of these conditions is due to the production of the container 5 as a flexible bladder wherein the shape enables a reduction of the internal volume as it is emptied, which maintains the necessary pressure for progressive emptying. When the tip 1 rotates, the centrifugal forces spread the container 5 against the inner skin 2. When the check valve 7 is open, as the icing conditions are met, the pressure applied by these centrifugal forces on the fluid results in said fluid being discharged via the check valve 7. The concavity 11 is progressively enlarged, which assists emptying. The de-icing fluid is dispersed in the gap 4 due to the centrifugal forces. If the outer skin 3 is made of spongy, fibrous, porous material, etc., it passes through same and helps melt or detach the ice deposited thereon in time. The gap 4 may also be replaced by a spongy or similar material; or may not exist, and the fluid in this case would be poured into the outer skin 3.

A slightly different embodiment will be described using FIG. 2. The tip 12 now comprises a single skin made of a material or structure permeable to the de-icing fluid. The container 5 is provided with the check valve 7 and only equipped with the valve 8 facing the outside. The shape thereof is roughly the same as in the previous embodiment, but it has a perforated outer wall 13, i.e. provided with multiple perforations, wherein the opening is calibrated to allow the desired flow rate of de-icing fluid pass on rotation of the tip 12. The fluid passes through the tip 12 and performs the de-icing activity thereof under the same conditions as described above.

The invention claimed is:

1. Turbo-engine compressor tip directed toward a front direction, containing a de-icing fluid container, characterized in that the container is formed by a flexible bladder which comprises a concavity directed toward a rear direction, opposite the front direction and in that the container is provided with a filling valve, and at least one calibrated opening de-icing fluid distribution orifice.

2. Turbo-engine compressor tip according to claim 1, characterized in that the distribution orifice is placed in the front direction with respect to the container and provided with an adjustable check valve.

3. Turbo-engine compressor tip according to claim 2, characterized in that the check valve has an opening performed according to the temperature.

4. Turbo-engine compressor tip according to claim 3, characterized in that the check valve comprises an active member made of shape memory alloy.

5. Turbo-engine compressor tip according to claim 3, characterized in that the filling valve is located extending from the check valve.

6. Turbo-engine compressor tip according to claim 1, characterized in that the container comprises a perforated peripheral face facing a spongy wall of the tip.

7. Turbo-engine compressor tip according to claim 1, characterized in that the distribution orifice opens into a gap between two skins of a wall of the tip, including one outer skin permeable to the fluid.

8. Turbo-engine compressor tip according to claim 1, characterized in that the bladder is made of fiber-reinforced polymer.

* * * * *